United States Patent [19]
Baumbick

[11] Patent Number: 5,923,809
[45] Date of Patent: Jul. 13, 1999

[54] OPTICAL POWER SOURCE DERIVED FROM ENGINE COMBUSTION CHAMBERS

[75] Inventor: Robert J. Baumbick, North Ridgeville, Ohio

[73] Assignee: The United States of America as represented by the Administrator of the National Aeronautics and Space Administration, Washington, D.C.

[21] Appl. No.: 09/040,194
[22] Filed: Feb. 2, 1998
[51] Int. Cl.[6] ................................................... G02B 6/00
[52] U.S. Cl. ........................ 385/147; 385/115; 385/139; 385/22
[58] Field of Search ..................... 385/147, 115, 385/116, 120, 138, 139, 15, 22

[56] References Cited

U.S. PATENT DOCUMENTS

| | | |
|---|---|---|
| 4,107,273 | 8/1978 | Suzuki et al. ........................ 423/263 |
| 4,412,446 | 11/1983 | Linder et al. ........................... 73/35 |
| 4,446,723 | 5/1984 | Boning et al. ........................... 73/35 |
| 4,839,902 | 6/1989 | Guch, Jr. ................................. 372/70 |
| 5,374,822 | 12/1994 | Steinke et al. ...................... 250/231.1 |
| 5,384,467 | 1/1995 | Plimon et al. ......................... 250/554 |
| 5,434,700 | 7/1995 | Yoo ........................................ 359/332 |
| 5,446,279 | 8/1995 | Hsu .................................... 250/227.21 |
| 5,505,177 | 4/1996 | Herdin et al. ........................... 123/435 |
| 5,544,478 | 8/1996 | Shu et al. ............................... 60/39.03 |
| 5,599,179 | 2/1997 | Lindner et al. .......................... 431/12 |
| 5,659,133 | 8/1997 | Sims et al. ............................... 73/116 |
| 5,684,309 | 11/1997 | McIntosh et al. ...................... 257/191 |

*Primary Examiner*—Phan Palmer
*Attorney, Agent, or Firm*—Kent N. Stone

[57] ABSTRACT

An optical power source is disclosed that collects the spectra of the light emissions created in a combustion chamber to provide its optical output signals that serve the needs of optical networks. The light spectra is collected by a collection ring serving as an optical waveguide.

9 Claims, 4 Drawing Sheets

SEE FIG-4

5,923,809

OPTICAL POWER SOURCE DERIVED FROM ENGINE COMBUSTION CHAMBERS

ORIGIN OF THE INVENTION

The invention described herein was made by an employee of the United States Government and may be manufactured and used by or for the Government for governmental purposes without payment of any royalties thereon or therefor.

FIELD OF THE INVENTION

The present invention relates to an optical power source and, more particularly, to an optical power source that provides light rays comprising a light emission spectrum created in a combustion chamber of an engine.

BACKGROUND OF THE INVENTION

Optical power sources used for optical sensors, communication and data transfer networks commonly use light emitting diodes (LEDs) or laser diodes (LDs). The laser devices produce laser beams that consist of visible light, or invisible infrared rays and some laser diodes produce light emissions that are so intense that environmental protection needs to be provided to safeguard the users of the laser devices. The LEDs and LDs serve as sources of optical energy, for optical circuits. This energy is modulated, by some physical phenomena, to change the original optical intensity or wavelength content. Optical wavelengths, measured in nanometers (nm), extend the range from 200 nm to 1500 nm with the visible spectrum occupying the range between 380 nm and 760 nm. The operating wavelength for the optical circuits is generally determined by the source wavelength, detector reception band, and the transfer characteristics of the waveguides used. The waveguides can be optical fibers or freespace. As will be described hereinafter, one of the advantages of the present invention is that the optical source is always present as long as the combustion process, associated with the present invention, is active as opposed to LEDs and LDs which can malfunction due to the failure of the semiconductors that generate the optical energy, or the failure of the power supply that is required for the operation of the LEDs and/or LDs.

Applications using this invention require a combustion chamber that provides the source of optical energy for the optical circuits served. Various usages of light emissions created by a combustion chamber are already known in the art, such as described in the following nine (9) U.S. Patents, all of which are herein incorporated by reference: U.S. Pat. Nos. 4,412,446; 4,446,723; 5,374,822; 5,384,467; 5,446,279; 5,505,177; 5,544,478; 5,599,179; and 5,659,133. It is desired that the light emissions available within a combustible chamber be utilized and conditioned so as to provide for an optical light source not having the need for backup components or for a protective environment such as those required for LDs.

Accordingly, it is a primary object of the present invention to provide for optical power extracted from engine combustion chambers to provide optical light sources for optical sensors and for optical communication and data transfer networks.

It is a further object of the present invention to provide means that utilize the light emissions available in a combustion chamber but adapts the light spectrum thereof to more readily match the needs of optical networks.

It is a still further object of the present invention to provide for various embodiments of collection architectures that attach to the combustion chamber, whose purpose it is, to collect the optical energy generated in the combustion chamber.

SUMMARY OF THE INVENTION

The invention is directed to an optical power light source that is adapted to a chamber that allows for a combustion process accompanied by the evolution of light which produces a light emission spectrum that serves the needs of optical networks.

The invention comprises a combustion chamber which burns a fuel, which generates an optical spectrum dependent on the fuel used, and a transparent portion which serves as an optical waveguide to collect the optical energy from the chamber and directs it to the point of use.

BRIEF DESCRIPTION OF THE DRAWINGS

The features of the invention believed to be novel are set forth with particularity in the appended claims. The invention itself, however, both as to organization and method of operation thereof, together with further objects and advantages thereof, may be best understood with reference to the following description taken in conjunction with the accompanying drawings in which like characters having the same reference numbers represent the same parts throughout.

DETAILED DESCRIPTION OF THE PREFERRED EMBODIMENT

Figure 1:
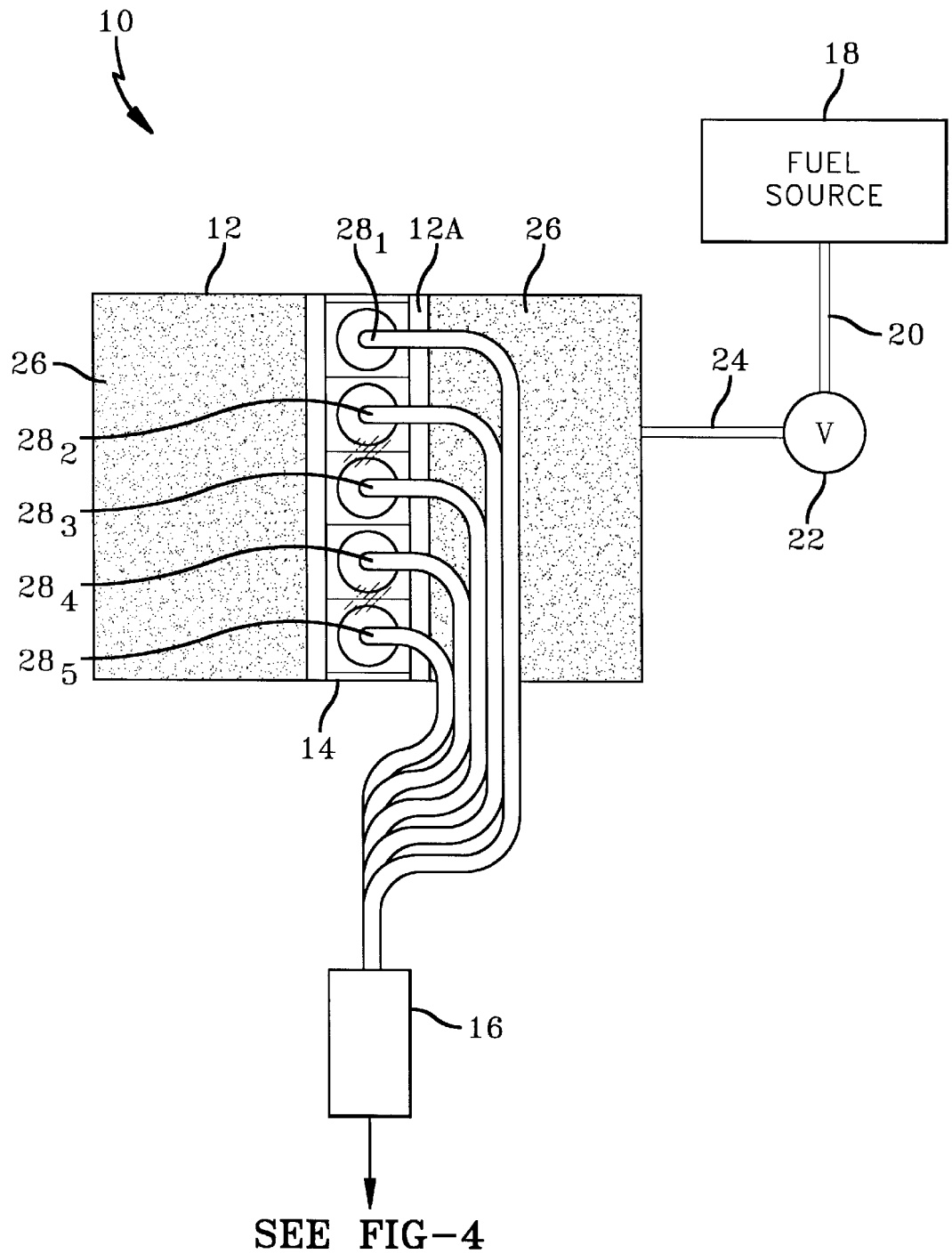
FIG. 1 is a schematic illustrating the essential elements of the present invention.

Referring to the drawings, there is shown in FIG. 1 an optical power light source 10 of the present invention comprising a combustion chamber 12 having a transparent section 12A, an optical waveguide 14 located on the transparent section 12A, and a fiber optic cable 16 serving as the extracting means. As will be described, the optical cable 16 serving as extracting means also serves as output means for carrying the light emission of the power source 10 to a utilization means of FIG. 4. Also, as will be discussed with reference to FIG. 2, the optical waveguide 14 may comprise a plurality of optical fibers $28_1 \ldots 28_N$ which, in turn, may comprise the fiber optical cable 16. The optical power light source 10 collects a spectrum of light emission created in a combustion chamber 12 to provide the optical light source used for optical applications, such as optical sensors, communication and data transfer networks. The optical networks without the benefits of the present invention typically depend on light emitting diodes (LEDs) and laser diodes (LDs) having the drawbacks described in the "Background" section.

The combustion chamber 12, except for the transparent section 12A, is of a conventional type, such as that found on aerospace engines or on automotive engines. The combustion chamber 12 is supplied with a selected fuel from the fuel source 18 by way of a conduit 20, a control valve 22, and a conduit 24. The combustion chamber 12 upon receipt of the fuel creates a combustion process that, in addition to the attendant heat, creates the evolution of light ray emissions defining a light spectrum. The light spectrum is determined by the fuel received by the combustion and the intensity of the flame involved in the creation of heat. The interrelationship between the intensity of the flame and the associated light rays with its particular wavelength band is more fully described, for example, in the previously mentioned U.S. Pat. No. 5,659,133. The light spectrum, created in the combustion chamber 12 generally illustrated in FIG. 1 by reference number 26 depends on the type of fuel used, but generally will consist of wavelengths in the range of 200 nm to 1500 nm. LEDs and LDs discussed in the "Background" section generally produce light rays in the range of 500 nm to 1500 nm.

The optical waveguide 14 collects the light spectrum comprising the light emissions 26 created due to the combustion process in the combustion chamber 12. The optical waveguide 14, in one embodiment, consists of an arrangement of optical waveguides comprising a plurality of optical fibers $28_1, 28_2 \ldots 28_N$ of FIG. 1. The optical waveguide 14 may be further described with reference to FIG. 2.

Figure 2:
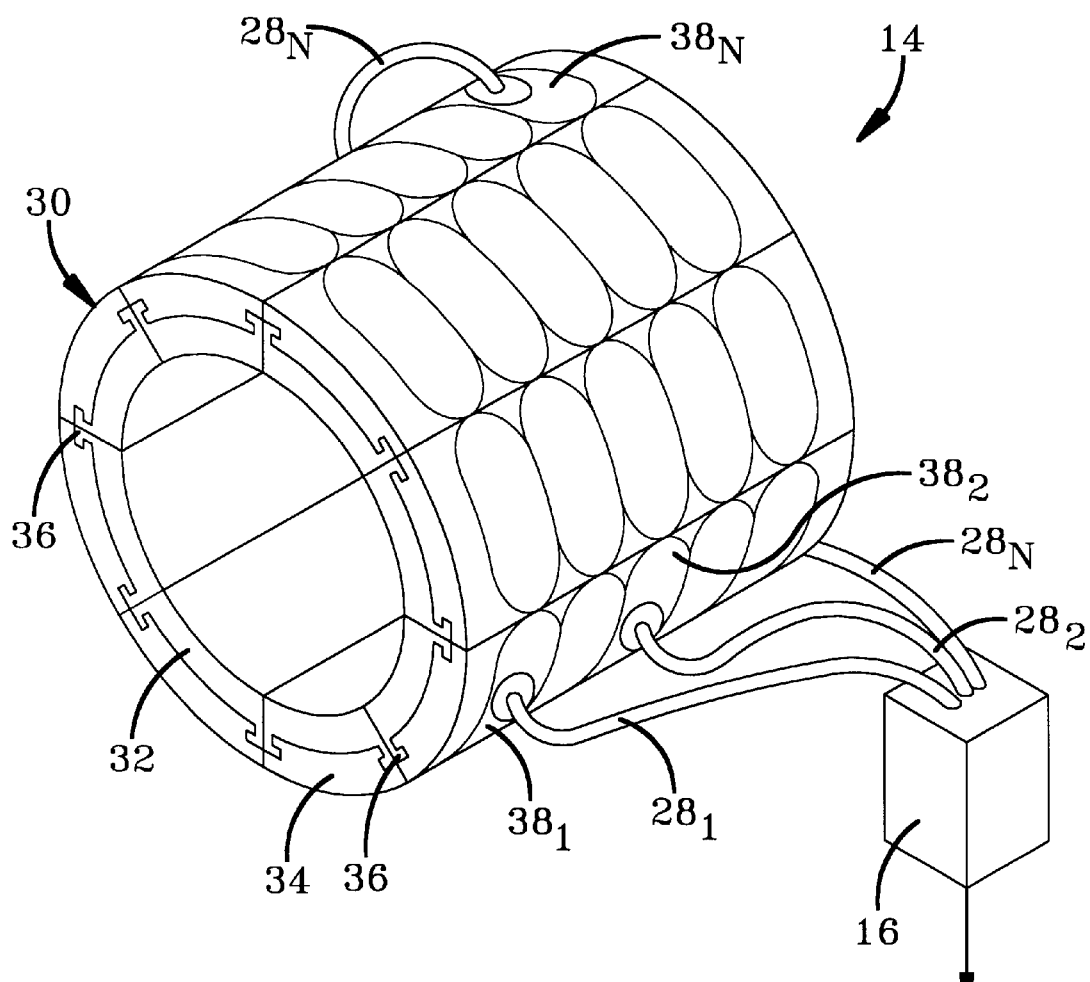
FIG. 2 illustrates an embodiment of the optical waveguide interface of FIG. 1.

FIG. 2 illustrates a first embodiment of the optical waveguide 14 comprising a collector segmented ring 30 having inner and outer sections 32 and 34, respectively, that are locked together by locking device 36. The inner and outer section 32 and 34, along with the locking device 36, are transparent and are selected of a material that is optically clear, such as clear silicon carbide, diamond or sapphire. The outer section 34 has transparent windows $38_1, 38_2 \ldots 38_N$, to which are fused the optical fibers $28_1, 28_2 \ldots 28_N$ (not fully shown in FIG. 2) which, in turn, comprise the fiber optical cable 16 which is routed to elements of FIG. 4 to be further described. The collector segmented ring 30 may be further described with reference to FIG. 3 which is composed of FIGS. 3(A) and 3(B).

Figure 3B:
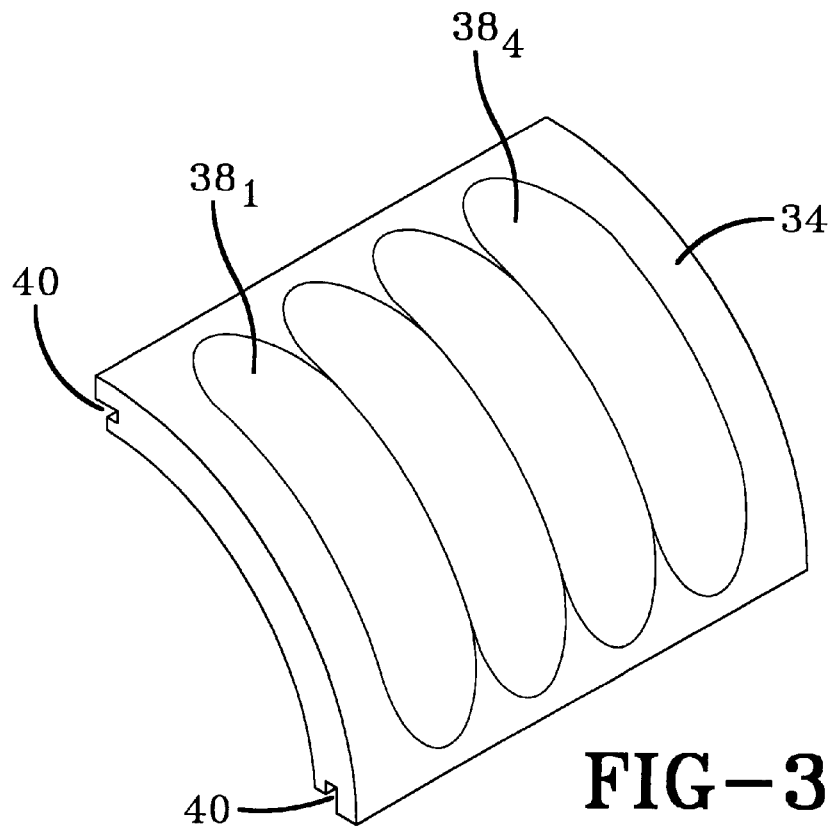
FIG. 3 illustrates further details of the optical waveguide interface of FIG. 2.
Figure 3A:
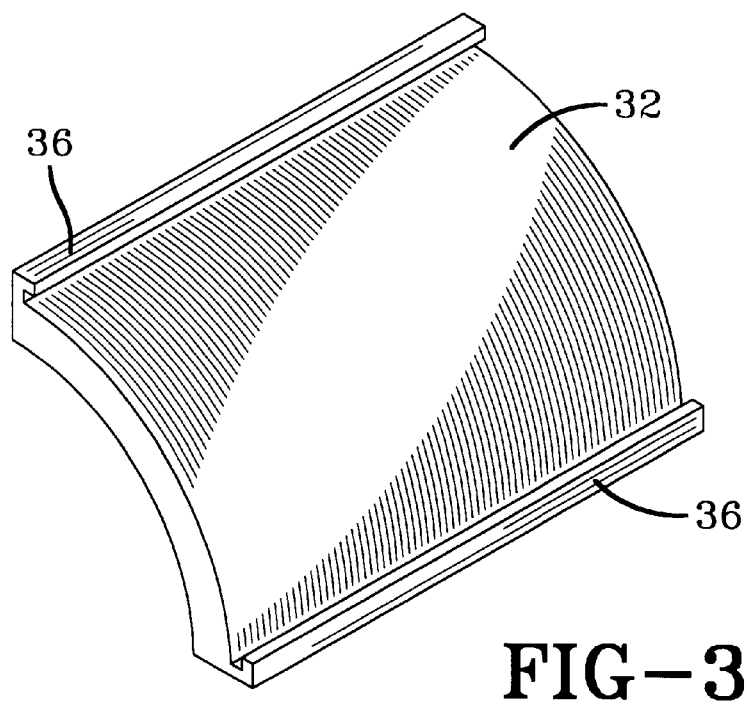

FIG. 3(A) illustrates the inner section 32 and, for one embodiment, illustrates the locking device 36 as being an integrate part of inner section 32 and having the form of a raised ledge that extends inward toward the center of the inner section 32 from both of the opposite ends of the inner section 32 as shown in FIG. 3(A). In operation, the inner section 32 is arranged to be in direct contact with the transparent section 12A. If desired, the locking device 36 may be a separate element so long as it provides the desired connection between the inner section 32 and outer section 34 in a manner as herein described.

FIG. 3(B) illustrates the outer section 34 as having the transparent windows $38_1 \ldots 38_N$ and grooves 40 at both of the opposite ends of the outer section 34. The grooves 40 of the outer sections 34 are dimensioned so as to slide into and lock with corresponding ledges 36 of the inner sections 32 and cause the outer sections 34 to be joined to the inner sections 32 in a manner similar to a tongue and groove joint. Further, the connection between the inner and outer sections 32 and 34, respectively, is preferably achieved by the use of solid portions, preferably in each of the sections 32 and 34, of optically clear material, serving as optical waveguides, that match the optical parameters of one end of each of the optical fibers $28_1, 28_2 \ldots 28_N$ with those of the collector segmented ring 30, more particularly, with the transparent windows $38_1, 38_2 \ldots 38_N$. The other end of each of the optical fibers $28_1, 28_2 \ldots 28_N$ is connected by appropriate means, such as being epoxied, glued or mechanical clamped, to a conventional connector which mates with the input stage of the elements shown in FIG. 4 to be described.

Figure 4:
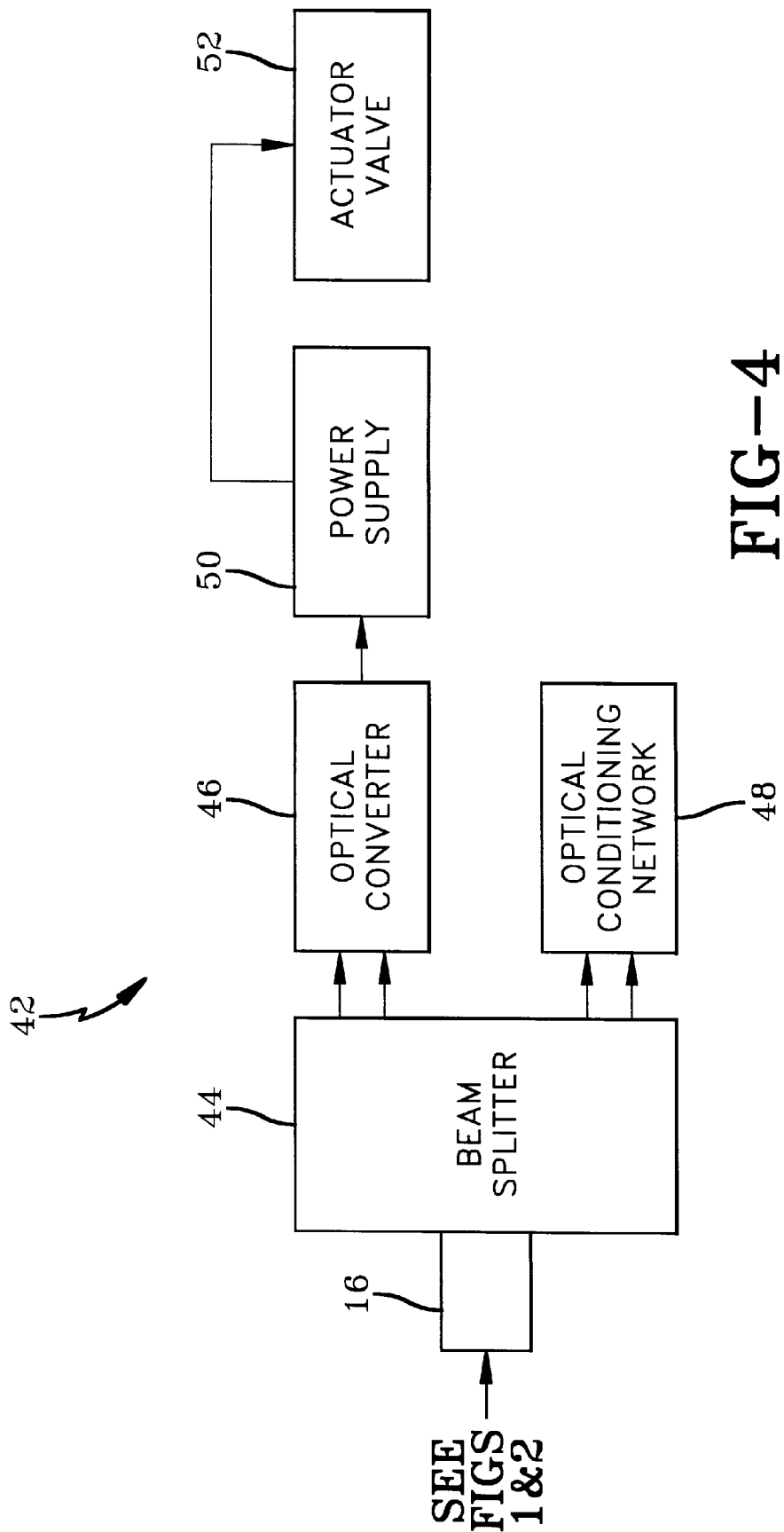
FIG. 4 is a block diagram illustrating the possible utilization of the optical output of the optical power light source of FIG. 1.

In operation, the light spectrum created by the combustion occurring in chamber 12 enters the inner section 32, exits the outer section 34, and then is carried by the fiber optical cable 16 comprised of optical fibers $28_1, 28_2 \ldots 28_N$ onto its point of usage, such as illustrated in FIG. 4 to be described.

The light spectrum created by the combustion chamber 12 may be utilized as is, depending on the fuel used and provided the power level captured by the optical waveguide 14 is sufficient to accommodate the requirements of the connected optical circuit FIG. 4. The light spectrum 26 created by the combustion process in the combustion chamber 12 may contain concentrated light emissions in a narrow band of wavelengths, 1300–1500 nm and may be used directly. Conversely, the optical energy contained in the light spectrum 26 may be concentrated in the 200–500 nm region, in which case the optical power from the combustion chamber 12 would be used in conjunction with suitable dopant crystals in the optical waveguide 14, each channel or series of optical fibers $28_1, 28_2 \ldots 28_N$ making up the optical cable 16 may have dopants with slightly different emission wavelengths, to upshift the wavelength (change from 500 nm to 1300 nm) required to match the transmission band of the optical networks. The upshifting phenomena is known art and is more fully described in U.S. Pat. Nos. 4,839,902; 4,107,273; 5,684,309; and 5,434,700, all of which are herein incorporated by reference. The upshifting phenomena is similar to the operation of a fluorescent light. The material dopants are excited by the light emissions from the combustion chamber 12 which causes a transition of electrons in low energy states. These electrons quickly rearrange into lower energy states, giving off light emissions in the range unique to the dopant material. This emitted light emissions are then used to provide the optical circuit of FIG. 4 with various bandwidth optical signals to be modulated by the related optical network.

An alternate embodiment of the waveguide of FIGS. 1–3 is to eliminate the solid connection between inner section 32 and outer section 34 of FIGS. 2 and 3. More particularly, the inner sections 32 and outer sections 34 of the collector segmented ring 30 of FIG. 2 are spaced apart, by appropriate means, such as spacers or by having the dimensions of raised ledges comprising the locking device 36 selected to separate the sections 32 and 34 so that the interface between inner sections 32 and outer section 34 is an annular section of freespace. The light emissions from the combustion chamber 12 fill the annular section of freespace and are collected by the outer sections 34 for further transmission by the optical cable 16 to the elements of FIG. 4.

FIG. 4 illustrates an arrangement 42 that is particularly suited for the conditions where the combustion chamber 12 output is a strong concentration of light emissions in the 200 nm to 500 nm band produced when hydrogen, in its gaseous form, is used as the fuel therein. FIG. 4 further illustrates a beam splitter 44 at the input stage of arrangement 42 that receives the light beam being carried by the fiber optic cable 16 and provides optical power to the electro optical converter 46 and to the optical conditioning network 48. The electro optical converter 46 converts the light emissions to electrical energy which is used to charge a power supply 50 that provides power to the low power stage of an actuator valve 52. The remaining part of the light emissions from the beam splitter 42 are directed to an optical conditioning network 48 which is used to upshift the optical spectrum to longer wavelengths for use by the optical circuit as described hereinbefore.

It should now be appreciated that the practice of the present invention provides for an optical power light source that extracts the light emission from an engine combustion chamber so as to provide for a light spectrum that is compatible with the light spectrum produced by light emitting diodes (LEDs) and laser diodes (LDs), but without the need of having backup components nor without the need of providing a protective environment for the optical power light source of the present invention.

Although certain features of the invention have been illustrated and described herein, many modifications and changes will occur to those skilled in the art. It is, therefore, to be understood that the appended claims were intended to cover all such modifications and changes as fall within the true spirit of the invention.

What I claim is:

1. An optical power source comprising:
   (a) a combustion chamber having a transparent section and which receives fuel capable of experiencing combustion that creates light rays that define a predetermined light spectrum;
   (b) an optical waveguide located on said transparent section and capable of collecting said lights rays of said predetermined light spectrum; and
   (c) output means for extracting said collected light rays of said light spectrum and providing an optical output serving as the output of the optical power source.

2. The optical power source according to claim 1, wherein said optical waveguide comprises:
   (a) a ring having inner and outer sections each comprised of a transparent material and with the inner section in proximity with the transparent section of said combustion chamber; and
   (b) a plurality of optical fibers each having first and second ends with the first end being exposed and located on the outer section of said ring.

3. The optical power source according to claim 2 further comprising a locking device for joining said inner and outer sections together.

4. The optical power source according to claim 3, wherein said outer section has opposite ends with grooves therein, and wherein said inner section has opposite ends each with a raised ledge, and wherein said grooves are dimensioned to slide onto and join with said ledges.

5. The optical power source according to claim 3, wherein said inner and outer sections and said locking device is selected from the group comprising clear silicon carbide, diamond and sapphire.

6. The optical power source according to claim 2, wherein said second end of said plurality of optical fibers serve as said means for extracting said collected light spectrum.

7. The optical power source according to claim 2, wherein said plurality of optical fibers comprises at least one optical fiber that is doped with a material that upshifts the frequency of said light spectrum.

8. The optical power source according to claim 1, wherein said fuel is hydrogen in a gaseous form and said predetermined light spectrum is in the 200 nm to 500 nm range.

9. The optical power source according to claim 1 further comprising:
   (a) a beam splitter having means for receiving the output of said optical power source and providing first and second optical outputs;
   (b) an optical conditioning network receiving said first optical output of said beam splitter;
   (c) an optical converter receiving said second optical output of said beam splitter and providing a representative electrical output signal therefrom; and
   (d) a power supply receiving and being responsive to said electrical output signal of said optical converter and generating power output signals.

* * * * *